United States Patent [19]

Dorner et al.

[11] Patent Number: 4,820,103
[45] Date of Patent: Apr. 11, 1989

[54] APPARATUS FOR VERTICALLY STACKING AND STORING ARTICLES

[75] Inventors: Wolfgang C. Dorner, Oconomowoc; Kenneth N. Hansen, Waukesha, both of Wis.

[73] Assignee: Dorner Mfg. Corp., Hartland, Wis.

[21] Appl. No.: 118,549

[22] Filed: Nov. 9, 1987

[51] Int. Cl.$^4$ ............... B65G 57/02; B65H 31/30
[52] U.S. Cl. ............... 414/790; 414/790.6; 414/924; 414/789.9; 198/403.6
[58] Field of Search ............... 414/43, 45, 46, 47, 414/48, 49, 98, 100; 198/463.6

[56] References Cited

U.S. PATENT DOCUMENTS

| | | | |
|---|---|---|---|
| 2,413,979 | 1/1947 | Lamb | 414/45 X |
| 2,661,100 | 12/1953 | Ashford | 414/331 |
| 2,895,624 | 7/1959 | Oster | 414/45 |
| 2,947,125 | 8/1960 | Wilson et al. | 414/46 X |
| 3,101,851 | 8/1963 | Heide et al. | 414/37 X |
| 3,688,920 | 9/1972 | Frish | 414/45 |

*Primary Examiner*—Leslie J. Paperner
*Attorney, Agent, or Firm*—Andrus, Sceales, Starke & Sawall

[57] ABSTRACT

An apparatus for vertically stacking and storing articles. The apparatus includes, in series, a stacking station, at least one storage storage, and an unloading station. A discharge conveyor is disposed beneath the stations. A stacking carriage is mounted for vertical movement in the stacking station, and with the carriage in an upper position, each article is individually fed onto the carriage and supported by a pair of supports that are movable between an inner supporting position and a release position. After each article is fed to the stacking carriage, the carriage is lowered in increments until the desired number of superimposed articles are applied to the carriage to form a stack. The carriage is then lowered to deposit the stack on the discharge conveyor, and the stack can then be conveyed through the storage stations directly to the unloading station, if there is no preceding stack at the unloading station, or alternately, the stack can be held in the storage stations until the unloading station is clear.

10 Claims, 3 Drawing Sheets

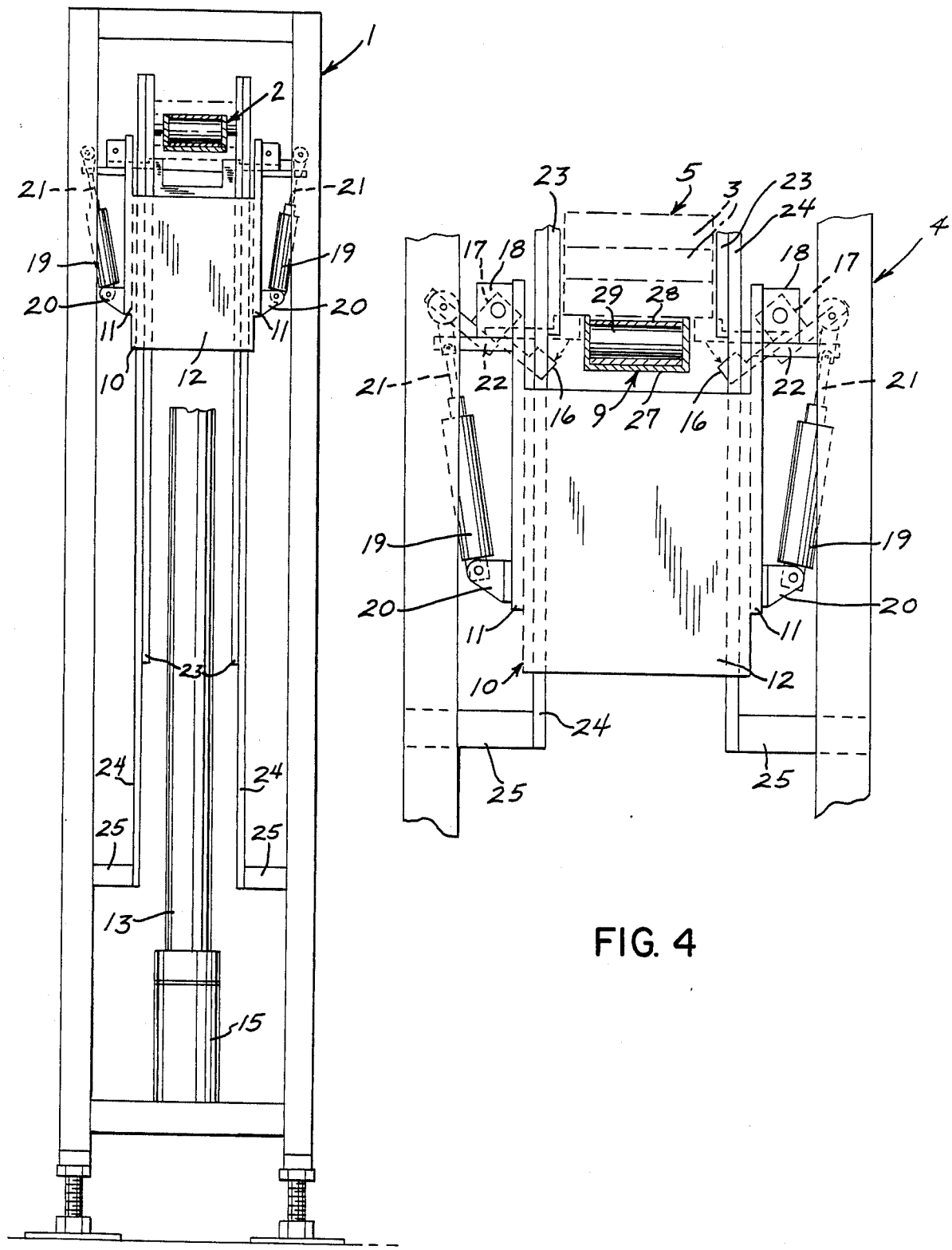

APPARATUS FOR VERTICALLY STACKING AND STORING ARTICLES

BACKGROUND OF THE INVENTION

In automatic conveying systems for conveying small articles, such as video cassettes, articles are conveyed in end-to-end relation on a main conveyor and it is frequently desired to remove the articles from the conveyor and stack the articles vertically for further processing or packaging. With certain conveying systems, different types of articles may be intermingled on the conveyor, so that it is necessary to sort the articles and then stack each type.

Summary of the Invention

The invention is directed to an apparatus for vertically stacking small parts or articles and storing the stack in the event the stack cannot be immediately removed from the stacking apparatus.

In accordance with the invention, the apparatus includes a stacking station, at least one storage station, and an unloading station, all of which are mounted above a conveyor. The parts or articles are fed individually to the stacking station, and a stacking carriage, that is vertically movable, is in an uppermost position to receive and support the articles in stacked relation.

The articles are supported on the carriage by a pair of support plates, which can be moved or pivoted between a supporting position and a release position.

As each article is successively fed to the stacking carriage, the carriage is indexed downwardly until the desired number of articles have been received to form a stack of desired height. The carriage is then lowered downwardly around the conveyor and the support plates are moved to the release position to release the stack onto the conveyor, where it is conveyed to the unloading station.

If the unloading station is clear, meaning that there is no previous stack at the unloading station, the newly formed stack will be fed directly through the storage stations to the unloading station for unloading. However, if a previously formed stack is at the unloading station, the newly formed stack will be stopped at the storage station by gates that are movable from a non-obstructing to an obstructing position. When the unloading station is clear, the gates will be moved to open position to enable the stack to be conveyed on the conveyor from the storage station to the unloading station.

The apparatus of the invention serves to stack small parts or articles and convey the stack to an unloading station. The stacks can be stored or accumulated in the event that the unloading station is not clear due to a downstream stoppage, so that the stacking mechanism can continue to operate without interruption even if the unloading station is not clear.

Other objects and advantages will appear in the course of the following description.

DESCRIPTION OF THE DRAWINGS

The drawings ilustrate the best mode presently contemplated of carrying out the invention.

In the drawings:

FIG. 3 is an end view of the apparatus;

FIG. 4 is an enlarged fragmentary plan view showing the construction of the carriage and the pivotable supports in the lower position;

DESCRIPTION OF THE ILLUSTRATED EMBODIMENT

Figure 1:
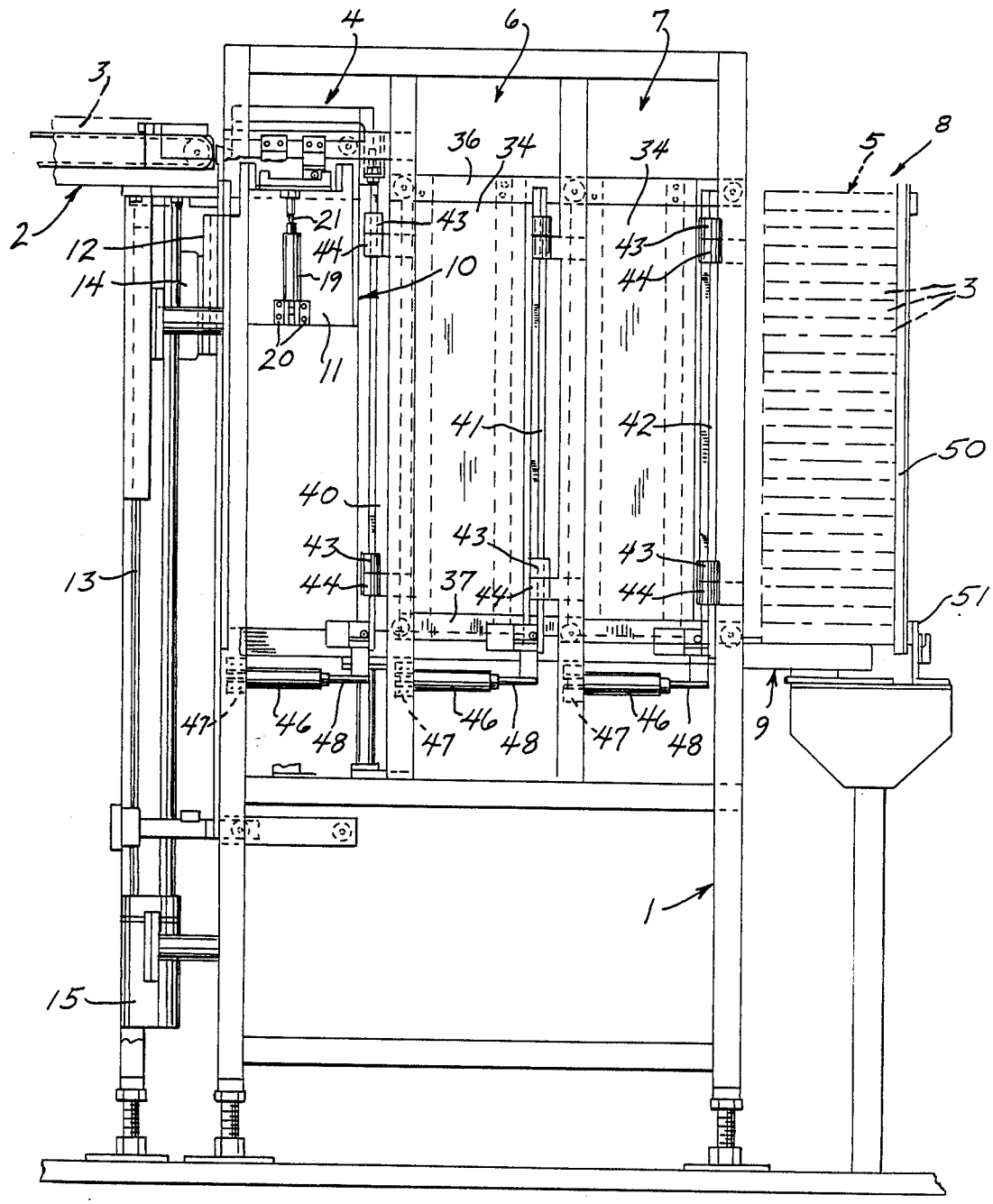
FIG. 1 is a side elevation of the apparatus of the invention.

The apparatus includes a suporting structure or frame 1 and an infeed conveyor 2 is mounted on the frame and is adapted to feed a multiplicity of small parts or articles 3 to the apparatus. The articles 3 are adapted to be stacked vertically in a stacking station 4 to form a vertical stack 5 and the stack 5 is then conveyed through a pair of storage stations 6 and 7 to an unloading station 8 by a conveyor 9, which is located beneath the stations 4, 6 and 7.

As illustrated in the drawings, articles 3 are shown to be generally rectangular in shape and may take the form of small boxes or containers for video cassettes, jewelry and the like. However, it is contemplated that the containers can take various shapes or configurations. Similarly, while the drawings illustrate a belt conveyor 2 for feeding the articles to the stacking station, it is contemplated that various types of conveyors or mechanisms can be employed to provide this function.

Stacking station 4 includes a vertically moving carriage 10, which is generally U-shaped in horizontal cross section and is composed of a pair of spaced parallel side walls 11 connected by end wall 12.

Carriage 10 is adapted to be moved vertically by a recirculating ball screw assembly, which includes a vertical housing 13 that houses the recirculating ball screw, and a nut assembly 14, which is engageable with the screw, extends outwardly from the housing and is connected to end wall 12 of carriage 10. The screw is rotated by a motor 15, which is connected to the lower end of housing 13 and rotation of the screw will move the nut assembly 14 vertically to thereby correspondingly move the carriage 10 in a vertical path. It is contemplated that other types of drives can also be used to elevate and lower the carriage, such as a fluid cylinder or chain drive.

Carriage 10 is shown in its uppermost position in FIG. 1 and in its uppermost position, the carriage will be located a slight distance beneath the level of the conveyor 2, so that the articles 3 being fed by conveyor 2 will drop or fall as they are discharged from the conveyor onto the carriage 10.

In forming a stack 5, the first article 3 will be supported on carriage 10 and the carriage will be indexed downwardly and each successive article will be supported on preceding articles to form the stack.

The articles 3 are supported on carriage 10 by a pair of support plates 16, which are mounted for movement on side walls 11 between an inner supporting position where the plates support the opposed side edges of the lowermost article 3 in the stack, to a release position where the spacing between the support plates is greater than the width of the articles, so that the stack of articles can pass between the support plates.

To mount the support plates 16 for movement, the outer corners of each support plate are provided with upstanding ears 17 which are pivotally connected to lugs 18 that extend outwardly from the respective side walls 11 of carriage 10.

To move the support plates between the supporting and release positions, a fluid cylinder 19, such as an air cylinder, is pivotally connected to angle brackets 20 mounted on the lower outer surface of each side wall 11 of carriage 10. Piston rod 21, which is slidable within each cylinder 19, is pivotally connected to a bracket 22, secured to the underside of the respective support plates 16. By extending piston rods 21, the support plates 16 will be moved to the downwardly inclined release position, as shown in FIG. 4, and conversely, retracting piston rods 21 will cause the support plates 16 to be pivoted to a generally horizontal supporting position.

To guide the stack 5 in vertical movement in the stacking station, a pair of vertical guide strips 23, composed of nylon or the like, are positioned inwardly of each side wall 11 of carriage 10 and each guide strip 23 is supported by a backing bar 24, which is connected to frame 1 through brackets 25.

Conveyor 9, which is located beneath the stacking station 4, storage stations 6 and 7 and unloading station 8, is composed of a generally U-shaped frame 27, and an endless belt 28 is mounted for travel on an idler pulley 29, which is journalled within the side walls of frame 27, and a drive pulley 30 that is located at the opposite or downstream end of the conveyor.

To drive belt 28 a motor 31 operates through a gear box 32 and the output of the gear box is coupled to shaft 33 of drive pulley 30. With this arrangement, operation of motor 31 will drive belt 28 in its endless path of travel.

After formation of the stack 5 at stacking station 4, the stack is transferred by conveyor 9 through the storage stations 6 and 7 to the unloading station 8. To guide the stack in movement on conveyor 9, a pair of vertical guide plates 34 are positioned in end-to-end relation along one side of conveyor 9. Plates 34 are supported from vertical columns 35 which in turn are attached to upper horizontal support bar 36 and lower horizontal support bar 37. Bars 36 and 37 are connected to vertical beams 38 of frame 1. A single guide plate 34 is mounted along the opposite side of conveyor 9 and can be mounted to frame 1 in a similar manner.

Stations 6-8 are separated by movable gates or stops 40-42. More specifically, gate 40 is located between stacking station 4 and storage station 6, while gate 41 is positioned between the storage stations 6 and 7, and gate 42 is located between storage station 7 and unloading station 8. Gates 40-42 are of similar construction and the construction of only gate 40 will be described in detail.

Figure 5:
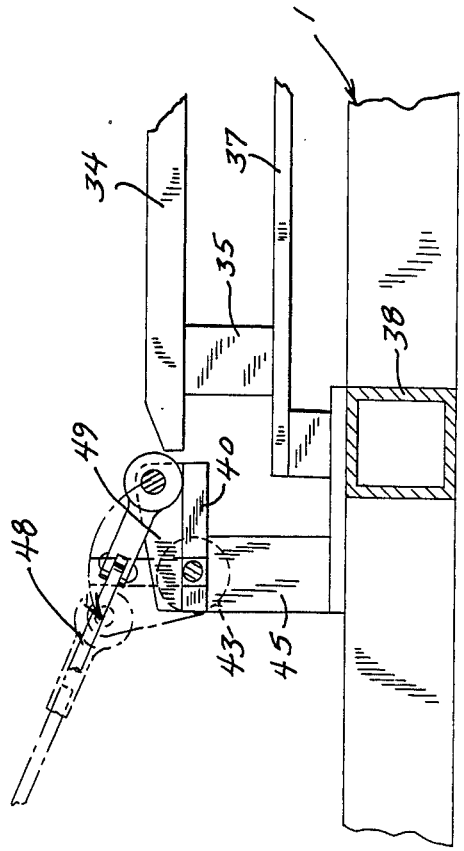
FIG. 5 is an enlarged fragmentary elevation showing the pivotal connection of the gates.

Bearing brackets 43 are secured to the upper and lower ends of gate 40 and bearing brackets 43 are pivotally connected to lugs 44, which are connected by arms 45 to frame members 38. This connection permits gate 40 to be pivoted between an inwardly extending obstructing position, as shown by the dashed lines in FIG. 5, where the gate will prevent movement of stack 5 on conveyor 9, to a release or non-obstructing position, as shown by the solid lines in FIG. 5, where the gate will not interfere with movement of the stack on the conveyor.

To pivot the gate from the obstructing to the non-obstructing position, a pneumatic cylinder 46 is mounted beneath conveyor 9 and one end of the cylinder is pivotally connected to frame members 47 of frame 1. A piston rod 48 extends outwardly from the opposite end of cylinder 46 and is pivotally connected to lug 49 which is secured to the lower end of the gate. By extending piston rod 48, the gate will be moved from the obstructing to the release or non-obstructing position.

Unloading station 8 includes a stop plate 50 which is located adjacent the downstream end of conveyor 9. Stop plate 50 is supported through brackets 51 from frame 1.

Figure 2:
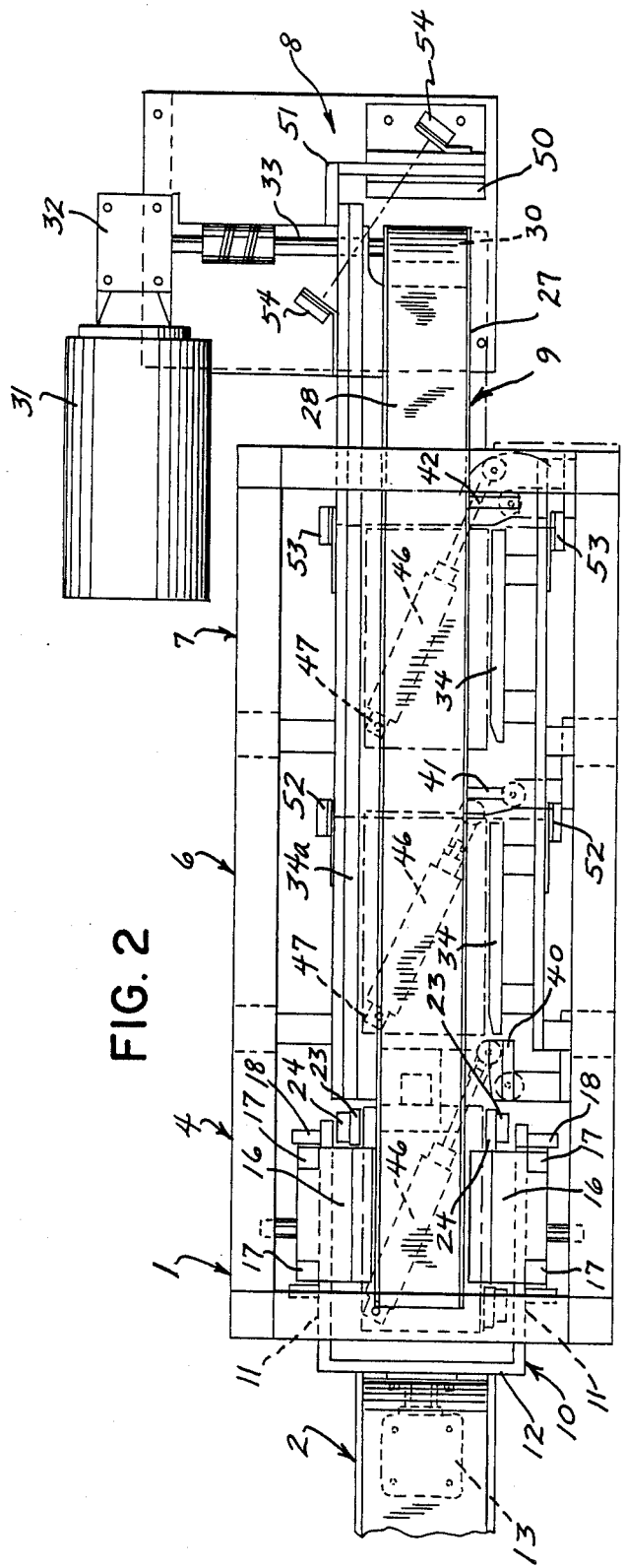
FIG. 2 is a top plan view of the apparatus.

Movement of each stack 5 between the stacking station and unloading station can be controlled automatically by a sensing system. In this regard, a pair of sensors 52, such as photoelectric sensors, can be positioned to detect a stack at the storage station 6, and similarly, a pair of sensors 53 can be positioned to detect the stack at the storage station 7. In addition, a pair of sensors 54 can be mounted on frame 1 to detect a stack in the unloading station 8, as shown in FIG. 2.

In operation, each article 3 is conveyed flatwise on infeed conveyor 2 and is discharged from the donwstream end of the conveyor into the carriage 10, which, at the beginning of the stacking operation is in its uppermost position. Supports 16 are in the generally horizontal supporting position where they will support the opposed ends of the article.

As each article is received in the carriage 10, the carriage is indexed downwardly in position to receive the next succeeding article and in this manner the stack 5 is formed.

When the stack has been completed, the supports 16 will be located slightly above the level of belt 28 of conveyor 9. As shown in FIG. 2, the spacing between the extended supports 16 is slightly greater than the width of conveyor belt 28. Similarly, the articles 3 have a greater width than belt 28 so that opposed sides of the articles in stack 5 project laterally beyond the corresponding sides of belt 28. Carriage 10 is then lowered around the conveyor 9 to position the supports 16 beneath the upper run of belt 28 and release the stack onto the conveyor 9. With the stack 5 supported on conveyor 9, supports 16 are then pivoted to the downwardly inclined release position and the carriage 10 is elevated to its original uppermost position. As the supports 16 are in the release position they wil be spaced apart a distance greater than the width of the stack 5, so that the supports will not contact the stack as the carriage 10 is elevated.

As the carriage is elevated, the gate 40 is opened and the stack is moved downstream on conveyor 9. By the time the carriage 10 has reached its uppermost position, the stack has been conveyed out of the stacking station 4. If there is no stack in storage station 6 or 7, or in unloading station 8, the stack will be conveyed directly to the unloading station where the stack can be unloaded manually, or can be moved by mechanical equipment to a working site.

If unloading station 8 is not clear, meaning that a stack is at the unloading station, gate 42 will move to a closed position to stop the stack 5 being conveyed on conveyor 9 and retain the stack at the storage station 7. If both the storage station 7 and unloading station 8 are full or occupied, gate 41 will close to retain the next succeeding stack 5 in the storage station 6. Similarly, with storage stations 6 and 7, as well as unloading station 8 occupied, gate 40 will close to retain the stack 5 at the stacking station 4 until the downstream stations have been cleared.

While the drawings illustrate a belt conveyor for feeding conveyors to the stacking station, it is contemplated the various types of conveyors can be used to feed that articles to the stacking station. Similarly, while the drawings have illustrated two stacking stations 6 and 7, it is contemplated that one or more stacking stations can be employed.

The invention enables articles to be vertically stacked and the stacks can be stored or accumulated, so that in the event of a stoppage in the unloading or operation of downstream equipment, the stacking can continue without interruption.

Various modes of carrying out the invention are contemplated as being within the scope of the following claims particularly pointing out and distinctly claiming the subject matter which is regarded as the invention.

I claim:

1. An apparatus for stacking articles, comprising a frame, a stacking station including carriage means mounted for vertical travel on the frame, support means disposed on said carriage means and including a pair of support members movable between a supporting position where said support members will support an article on said carriage means and a release position, conveyor means disposed beneath said stacking station and having a width less than the distance between said support members when said support members are in the supporting position, drive means for lowering said carriage means as each article is fed to said carriage means to thereby form a stack of said articles, said carriage means being movable to a lower position to thereby deposit said stack on said conveyor means, said conveyor means being constructed and arranged to move said stack out of said stacking station, a plurality of storage stations disposed above said conveyor means and located downstream in the direction of movement of said conveyor means from said stacking station, and gate means disposed between said stacking station and said storage station and disposed between each adjacent pair of storage stations, each gate means being movable between a closed position where said gate means will prevent movement of the stack on said conveyor means to an open position where said gate means will not interfere with movement of said stack on said conveyor means.

2. The apparatus of claim 1, wherein said carriage means is generally U-shaped in horizontal section and has an open side to receive an end of said conveyor means as said carriage means is lowered to said lower position.

3. The apparatus of claim 2, wherein said carriage means includes a pair of spaced side walls and an end wall connecting said side walls together, said drive means being operably connected to said end wall.

4. An apparatus for stacking and storing articles, comprising a supporting structure, a stacking station on said supporting structure and including a carriage mounted for vertical travel, a pair of support member mounted on said carriage and movable between a supporting position where said support members will support opposite portions of an article to a release position, at least one storage station disposed adjacent said stacking station, an unloading station disposed on the opposite side of said storage station from said stacking station, conveyor means disposed beneath said stations and having a width less than the distance between said support members when in the supporting position, and drive means for lowering said carriage as each successive article is fed to said carriage to form a stack on said support members, said carriage being movable to a lower position to thereby deposit said stack on said conveyor means, first gate means located between said stacking station and said storage station, and second gate means disposed between said storage station and said unloading station, said first and second gate means each being movable between an obstructing position where said gate means will prevent movement of a stack on said conveyor means and a non-obstructing position where said gate means will not interfere with movement of said stack on said conveyor means.

5. The apparatus of claim 4, wherein said first and second gate means each extend substantially the full height of said stack.

6. The apparatus of claim 5, wherein said first and second gate means are pivotally connected to said supporting structure.

7. The apparatus of claim 6, and including fluid cylinder means for moving said first and second gate means between said obstructing and non-obstructing positions.

8. The apparatus of claim 4, wherein said carriage is generally U-shaped in horizontal cross section and has an open side to receive the upstream end of said conveyor means when said carriage is in said lower position.

9. The apparatus of claim 4, and including first sensing means for sensing the presence of a stack at said unloading station and operably connected to said second gate means for moving said second gate means to the obstructing position when a stack is at said unloading station, and second sensing means for sensing the presence of a stack at said storage station and moving said first gate means to the obstructing position.

10. An apparatus for stacking articles, comprising a frame, a stackign station including a carriage mounted for vertical travel on the frame, drive means for moving said carriage on said frame, support means disposed on said carriage and including a pair of support members mounted for pivotal movement on said carriage from a generally horizontal supporting position and a downwardly disposed release position wherein the distance between said support members is greater than the width of said articles, conveying means disposed beneath said stacking station and having a width less than the distance between said support members when in said supporting position, said drive means being operable to lower said carriage as each successive article is fed to said carriage to form a stack on said support members, said carriage being movable to a lower position to thereby deposit said stack on said conveyor means, and fluid cylinder means for pivoting said support members between said release position and said horizontal supporting position, said fluid cylinder means containing a compressible fluid and comprising the sole support for said support members when in the supporting position.

* * * * *

UNITED STATES PATENT AND TRADEMARK OFFICE
CERTIFICATE OF CORRECTION

PATENT NO. : 4,820,103

DATED : April 11, 1989

INVENTOR(S) : WOLFGANG C. DORNER ET AL

It is certified that error appears in the above-identified patent and that said Letters Patent is hereby corrected as shown below:

Col. 5, line 53, CLAIM 4, Cancel "member" and substitute therefor ---members---; Col. 6, line 39, Cancel "stackign" and substitute therefor ---stacking--- (CLAIM 10).

Signed and Sealed this

Fourteenth Day of August, 1990

Attest:

HARRY F. MANBECK, JR.

Attesting Officer

Commissioner of Patents and Trademarks